Feb. 10, 1970 P. R. LEAL ET AL 3,495,075

SHIFTING APPARATUS

Filed Dec. 13, 1966

*INVENTORS.*
PETER R. LEAL
ANDREW D. LIN

BY John H. Holcombe
Attorney

United States Patent Office 3,495,075
Patented Feb. 10, 1970

3,495,075
SHIFTING APPARATUS

Peter R. Leal, Rockville, Md., and Andrew D. Lin, Campbell, Calif., assignors to International Business Machines Corporation, Armonk, N.Y., a corporation of New York Filed Dec. 13, 1966, Ser. No. 601,498
Int. Cl. G06f 7/385, 11/00
U.S. Cl. 235—175 11 Claims

ABSTRACT OF THE DISCLOSURE

Non-shifting, standard, binary storage register is employed with control circuitry and a binary adder to add a binary number stored in the register to itself, and the result stored in the register, thereby effecting a shift of the binary number. In a computing apparatus, such as a control unit for a random access storage file, an arithmetic logic unit and storage registers are operated by microprogram control to effectively shift the binary data and employ suitable feedback for the purpose of obtaining error detection and correction of binary data from the file.

Figures 1, 2, 3:
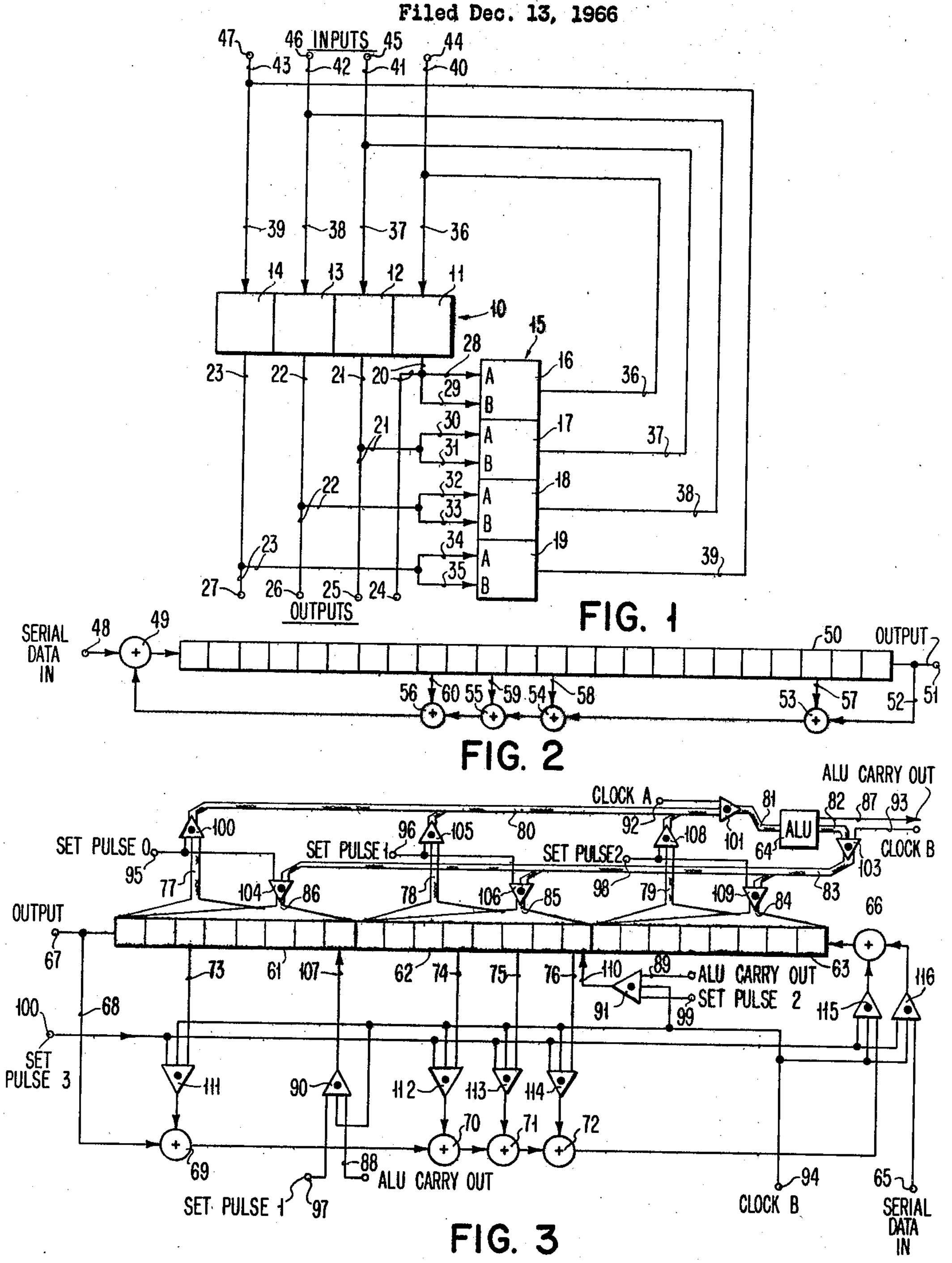

This invention relates to means for shifting numbers, and more particularly to means employing non-shifting storage means for shifting binary numbers.

Shifting is normally accomplished by means of a shift register. The shift register comprises a plurality of individual storage stages and a plurality of temporary storage means, or delay units, interconnecting the output of a stage to the input of the next adjacent stage. Data is thus stored in the storage units and transferred upon command from the output thereof through the delay unit to the input to the adjacent storage unit, thereby being shifted one position. Various logic means may be utilized to connect the delay unit to various other storage means allowing shifting forward or backward or shifting of a plurality of positions.

Examples of shift registers and the complexity of the circuitry involved in building such shift registers may be seen in R. K. Richards, Digital Computer Components and Circuits, D. Van Nostrand Company, Inc., published November 1957, pages 103–5 and 136.

In many processing applications, a storage means and an arithmetic logic unit (ALU), inter alia, may be provided, but it is necessary to add an expensive shift register, as above, together with the connection circuitry, to the present hardware in order to accomplish shifting of data.

An example where such an implementation is particularly advantageous comprises a data processing, retrieval or transmission facility employing error detection and/or correction.

Coding techniques and block diagrams of the hardware necessary to implement error detecting and correcting are well documented in W. W. Peterson, Error-Correcting Codes, J. Wiley and Sons, New York, 1961.

The basis of such codes as implemented in logic comprises the supplying of data to the logic to thereby generate a remainder, or parity block. Upon a receipt or retrieval of the data, the data and parity block are again supplied to the logic. If the resultant remainder therefrom is all zeros, the data is correct. If the remainder is not all zeros, an error is detected. To correct the error, the retrieved data, parity blocks, and new remainder are supplied to the logic to thereby generate the correct data and parity block.

When implemented in hardware, the logic circuitry (called a block parity generator) conventionally takes the form of a shift register with reverse feedback taps connected from selected points of the shift register to modulo-two half-adders, which are connected to the input of the shift register in order to thereby simulate in logic the generator code.

The addition of such a shift-right register to the unit is very expensive, perhaps prohibitively so. However, the data processor or translator in all likelihood already contains a non-shifting storage means and an arithmetic logic unit.

Thus, it is an object of the present invention to provide means for shifing binary numbers without utilizing a shifting register.

A further object of the present invention is to provide, in a data processor or translator, means for shifting binary numbers utilizing storage means and arithmetic logic normally present therein.

Another object of the present invention is to provide error detection means not including a shifting register.

Still another object of the present invention is to provide, in a data processor or translator, error detection means utilizing a non-shifting storage means and arithmetic logic normally included therein to accomplish the shifting operation required as part of such error detection.

In accordance with this invention, means is provided for shifting binary numbers including a storage register for storing a plurality of binary digits, an adder for adding multidigit binary numbers, and control circuitry for causing a binary number stored in the register to be added to itself by the adder and the resultant sum inserted in the register.

The foregoing and other objects, features and advantages of the invention will be apparent from the following more particular description of preferred embodiments of the invention, as illustrated in the accompanying drawings.

In the drawings:

FIGURE 1 is a schematic block diagram of apparatus constructed in accordance with the invention;

FIGURE 2 comprises a schematic block diagram of a conventional implementation of a block parity generator; and FIGURE 3 is a schematic block diagram of a block parity generator constructed to utiltze the apparatus of the invention.

As stated above, shifting in the prior art is accomplished by means of a shift register. The shift register may take many forms, but does comprise a specified arrangement of functions regardless of the form these functions take. Basically, the shift register comprises a plurality of individual storage stages and a plurality of temporary storage means each interconnecting the output of a stage to the input of the stage to which the data is to be shifted. Hence, the functions of the storage stages are to store the data and make it available for use, and the function of the temporary storage means are to transmit the data to the stages to which the data is to be shifted, temporarily storing the data during the time of such transmission. The need for these two functions is easily observed in that, by shifting data, the data currently in the stage is to be transmitted to a following stage and, unless a temporary storage means is provided, new data is simultaneously inserted into the storage stages. Thus, a delay is necessary in transmitting the data so that only the correct data is transferred.

Most data processing systems presently utilize a standard storage register. Such a register in the binary art comprises a plurality of individual stages. These stages are designed to store data until either reset or until supplied with new data. Such registers do not utilize additional temporary storage or delay means. Hence, when adding a system function requiring shifting it has been necessary to add an expensive shift register, as above, to the system, or at least to add the plurality of temporary storage or delaying means, together with the connection circuitry, to the standard storage register.

This invention allows the use of a standard binary storage register and an arithmetic logic unit (ALU) normally present in most data processing systems, as a shift register.

The basis for the invention may be seen by reference to FIGURE 1. A storage register 10 is provided comprising a plurality of individual binary storage stages 11 through 14. Also provided is an adder 15 comprising a plurality of individual adder stages 16 through 19 suitably interconnected to provide for carries therebetween. Examples of such registers and such adders are prevalent in the art and at least one of each is utilized in some form in substantially every digital data processing apparatus.

The output terminal of binary storage stages 11 through 14 are connected by means of lines 20 through 23, respectively, to output terminals 24 through 27. The output of storage stage 11 is also connected, via lines 20, 28 and 29 to both inputs of adder stage 16. Likewise, the outputs of storage stages 12–14 are connected via lines 21–23, respectively, and lines 30–35 to both inputs of adder stages 17–19, respectively. The output of adder stages 16 through 19 are connected, via lines 36 through 39, respectively, to the inputs of storage stages 11 through 14, respectively. Likewise, lines 40 through 43 connect input terminals 44 through 47 to lines 36 through 39, which in turn are connected to the inputs of storage stages 11 through 14, respectively. In addition, suitable clocking circuitry (not shown) is provided for controlling the transfer of data from register 10 into adder 15, the addition thereof by adder 15, and the transfer of the sum from adder 15 into register 10. Suitable clocking may also be provided to transfer data from input terminals 44–47 into register 10 and from register 10 to output terminals 24–27.

In operation, data is provided at input terminals 44–47. Under control of the suitable clocking means, this data is transferred, via lines 40–43 and 36–39 to stages 11–14 of register 10, and stored therein. To shift this data one stage to the right, the data stored therein is transmitted via lines 20–23 and 28–35 to added 15. The output of each stage of the register is thereby transmitted to both inputs of the corresponding stage of the added. For example, adder 15 adds the data appearing at inputs A of each stage to the data appearing at inputs B of each stage. Thus, the data transmitted from stage 11 of register 10 is transmitted via lines 20, 28 and 29 to inputs A and B of stage 16 of adder 15. This data from stage 11 as appearing at input A of stage 17 is then added to itself, the data appearing at input B of stage 16. Likewise, the output of each of the other stages of register 10 is added to itself in the corresponding stages 17 through 19 of adder 15. Adder 15 is so arranged that the appropriate carries are made between the stages of the adder.

The resultant output of adder 15 is then transmitted, under the control of clocking, by means of lines 36 through 39 to stage 11 through 14 of register 10.

The apparatus of FIGURE 1 is now usable as a shift register for serially received data wherein input terminal 44 comprises the input to the shift register and output terminal 27 serves as the output from this shift register.

The following example will serve to illustrate the operation of the circuit as a serial shift register.

In the example, it is assumed that the digital number 01101 is received serially at input terminal 44, shifted to the left in register 10 by the apparatus of FIGURE 1, and transmitted serially at output terminal 27.

Assume now that the first binary "0" is read and transmitted to input terminal 44. The "0" is transmitted via lines 40 and 36 and stored in stage 11 of register 10. Immediately thereafter, the clocking transmits the "0" via lines 20, 28 and 29 to inputs A and B of stage 16 of adder 15. Binary "0" added to binary "0" equals binary "0," providing an output of "0" on line 36 of stage 16. There is also no carry from stage 16 to stage 17; hence, a "0" appears on output line 37 from stage 17.

At this time, the following "1" is read and supplied to input terminal 44. The "1" overrides the "0" appearing on line 36 and is entered into stage 11 of register 10 at the same time that the "0" on line 37 is entered into stage 12 of register 10.

Thus, the "0" originally entered into stage 11 of register 10 has been shifted to stage 12 of register 10 and the following sequential binary digit has been entered into stage 11. This has accomplished the left-shift function of a shift register by means of an ordinary storage register 10 and an adder 15.

Now, the "1" stored in stage 11 is transmitted on lines 20, 28 and 29 to the A and B inputs of adder stage 16 and the "0" stored in stage 12 is transmitted on lines 21, 30 and 31 to the A and B inputs of adder stage 17. In stage 16, the "1" at the A input is added to the "1" at the B input to provide a "0" result with a carry to stage 17. At stage 17, the "0" at the A input is added to the "0" at the B input to equal "0," and when added to the carry of "1" from stage 16, thereby equals "1." No carry is provided to stage 18. Therefore, the sum at that stage is equal to "0."

Under the control of clocking, the "0" at stage 16, the "1" at stage 17 and the "0" at stage 18 are transmitted, respectively, on lines 36, 37 and 38. Simultaneously, the serially following binary digit of "1" is read and received at input terminal 44. This is transmitted on line 40 overriding the "0" on line 36 and is inserted in stage 11 of storage register 10. Simultaneously, the "1" on line 37 is received in stage 12, and the "0" on line 38 is received in stage 13 of storage register 10.

Thus, the digits "0" and "1" stored, respectively, in stages 12 and 11 of register 10 have been shifted to the left one stage, to stages 13 and 12, respectively, and the sequentially following binary digit from input 44 has been entered into stage 11.

At this time, the "1" store in stage 11 is transmitted on lines 20, 28 and 29 to the A and B inputs of adder stage 16, the "1" stored in stage 12 is transmitted on lines 21, 30 and 31 to the A and B inputs of adder stage 17, and the "0" stored in stage 13 is transmitted on lines 22, 32 and 33 to the A and B inputs of adder stage 18. In stage 16, the "1" at the A input is added to the "1" at the B input to provide a "0" result with a carry to stage 17. At stage 17, the "1" at the A input is added to the "1" at the B input to equal "0," and when added to the carry of "1" from stage 16, thereby equals "1" with a carry to stage 18. At stage 18, the "0" at the A input is added to the "0" at the B input to equal "0," which is added to the carry of "1" from stage 17 to thereby equal "1." No carry is provided to stage 19. Therefore, the sum at that stage is equal to "0."

Under the control of clocking, the "0" at stage 16, the "1" at stage 17, the "1" at stage 18 and the "0" at stage 19 are transmitted, respectively, on lines 36–39. Simultaneously, the serially following binary digit of "0" is read and received at input terminal 44. This is transmitted on line 40 and is inserted in stage 11 of storage register 10. At the same time, the "1," "1" and "0" on lines 37–39 are received, respectively, in stages 12–14 of storage register 10.

Now, the process proceeds again, transmitting the "0" from stage 11 of register 10 to the A and B inputs of adder stage 16, the "1" stored in stage 12 to the A and B inputs of adder stage 17, the "1" stored in stage 13 to the A and B inputs of adder stage 18, and the "0" stored in stage 14 to the A and B inputs of adder stage 19.

In addition, the "0" stored in adder stage 14 of register 10 is transmitted to output terminal 27. This is thus the first digit to be shifted entirely through the stages of register 10 and transmitted on the output of the overall shift register, which is output terminal 27.

Thus, the "0" binary digit originally entered at input terminal 44 has been shifted in series of four steps through the stages of storage register 10 to appear at output terminal 27.

The process continues with the "0" on line 28 added to the "0" on line 29 in adder stage 16 appearing as "0" on line 36, etc. Thus, the outputs on lines 36–39, respectively, now are "0," "0," "1" and "1." These outputs are transmitted to storage register 10 and stored therein, except that the serially following binary digit of "1" is read and received at input terminal 44, overriding the "0" on line 36, and is inserted in stage 11 of storage register 10. Thus, stage 11 contains a "1," stage 12 contains a "0," stage 13 contains a "1" and stage 14 contains a "1."

On the next cycle, these digits are transmitted to the A and B inputs of adder stages 16–19 of adder 15, and the "1" stored in stage 14 is transmitted to output terminal 27. As a result of the addition in adder 15, the outputs on lines 36–39 are, respectively, "0," "1," "0" and "1." These digits are transmitted to storage stages 11–14, respectively, of storage register 10. No additional digit is received at input terminal 44; therefore, no new digit is entered into stage 11 of the storage register.

The binary digits now under consideration comprise a "1" in stage 12, a "0" in stage 13 and a "1" in stage 14.

On the next cycle, these digits are transmitted, respectively, to the A and B inputs of adder stages 17–19, and the "1" of stage 14 is transmitted to output terminal 27. The subsequent addition now provides a "0" on line 37, a "1" on line 38 and a "0" on line 39. These digits are then transmitted to storage register 10.

The digits now under consideration comprise a "1" in stage 13, and a "0" in stage 14 of storage register 10.

In the following cycle, these digits are transmitted to both inputs of, respectively, stages 18 and 19 of adder 15, and the digit "0" of stage 14 is transmitted to output terminal 27.

The resultant addition provides a "1" on line 39, which is transmitted to stage 14 of storage register 10. In the following cycle, this digit is transmitted on output terminal 27.

It has thus been shown that a binary number received serially at input terminal 44 may be shifted serially to the left by means of the apparatus of FIGURE 1 to appear four character times later as a serial output at terminal 27. In this manner, the storage register 10 and the adder 15 have cooperated to perform the function of a binary shift register.

An example of a conventional block parity generator for error detection and correction is shown in FIGURE 2. Serial data is received at input terminal 48 to a modulo-two half-adder 49. A modulo-two half-adder is a circuit well known in the computing art and is also known as an exclusive-OR circuit. The output of the modulo-two half-adder is as follows: If both inputs comprise 0's or 1's, the output will be a 0; and if one input is a 0 while the other is a 1, the output will be a 1.

The output of the modulo-two half-adder 49 is transmitted to the input of shift register 50. The output of the shift register is transmitted to output terminal 51 and is also fed back via line 52 and a series of half-adders 53–56 to the second input terminal to half-adder 49. A set of taps 57–60 are connected from selected stages of shift register 50 to the second inputs 53–56.

The generator polynomial embodied in the block parity generator of FIGURE 2 is thus $$g(x)=(x^{13}+1)\ (x^{11}+x^2+1)=x^{24}+x^{15}+x^{13}+x^{11}+x^2+1$$

The physical embodiment of the equation may be visualized as follows: Shift register 50 comprises 24 binary stages. Thus, a binary digit ($x^0$) in the right most stage of shift register 50 is transmitted to output terminal 51 and fed back on line 52 to modulo-two half-adder 53. At the same time, the output ($x^2$) of the stage third from the right is transmitted via output 57 to the other input of modulo-two half-adder 53. The output of modulo-two half-adder 53 is then transmitted to one input of modulo-two half-adder 54. The other input to the half-adder comprises the output ($x^{11}$) of the stage of shift register 50 being the twelfth from the right. This output is transmitted to modulo-two half-adder 55, the other input of which is from the stage of shift register 50, two more stages to the left ($x^{13}$). The output of this half-adder becomes one input of half-adder 56, with the output ($x^{15}$) of stage of shift register 50 two more spaces to the left as the other input thereto. The output of this half-adder is transmitted to become one input of modulo-two half-adder 49. The other input to half-adder 49 is the serially following binary digit ($x^{24}$) from input terminal 48. Thus, the following binary digits are exclusive-ORed:

$$(x^{24}+x^{15}+x^{13}+x^{11}+x^2+1$$

which comprises the above equation.

The function of the apparatus of FIGURE 2 for generating parity bits and for error detection and correction is explained in the above-cited reference by W. W. Peterson.

The apparatus of FIGURE 2 is duplicated in FIGURE 3 except that three storage registers 61–63 and an arithmetic logic unit (ALU) 64 are substituted for shift register 50 and suitable clocking circuitry has been added.

Input terminal 65, modulo-two half-adder 66, output terminal 67, feedback line 68, modulo-two half-adders 69–72, and feedback taps 73–76 correspond exactly to input terminal 48, modulo-two half-adder 49, output terminal 51, feedback line 52, modulo-two half-adders 53–56, and feedback taps 57–60 of FIGURE 2, respectively.

Each of the storage register sections 61–63 are individually connected via cables 77–81 to both sets of inputs of arithmetic logic unit (ALU) 64, which includes an adder similar to adder 15 of FIGURE 1. Likewise, the outputs of the ALU are connected in parallel via cables 82–86, to the stages of the storage register sections. In addition, another output from the adder is utilized. In adder 15 of FIGURE 1, the carry from stage 16 was connected into stage 17, the carry from stage 17 connected to stage 18, the carry from stage 18 connected to stage 19, and no carry was provided from the last stage, stage 19. In the ALU for FIGURE 3, the carry from the last stage of the adder is utilized on line 87. This output appears at input terminals 88 and 89 to AND circuits 90 and 91.

Clocking means (not shown) comprising any suitable digital pulse clock source, of the type used in digital computing or recording apparatus, provides various digital pulses to control the sequencing and gating of the operations of the apparatus of FIGURE 3.

The basic clock pulses which control the exact timing of the operations are of two phases A and B which are of the same frequency and are interlaced. The A pulses are provided at clock source 92 and the B pulses at clock sources 93 and 94.

The various set pulses operate at one-fourth the clock frequency to control the transfer of data to and from the ALU (set pulses 0–2) and gating of the serial input data and the feedback data (set pulse 3). Set pulse 0 is supplied at set pulse source 95, set pulse 1 at sources 96 and 97, set pulse 2 at sources 98 and 99, and set pulse 3 at source 100. Each set pulse is of sufficient duration to include both phases of the clock. Thus, the set pulses enable certain circuitry which is then operated by the clock.

Gating circuits 100 and 101 are controlled, respectively, by set pulse 0 from source 95 and clock phase A from source 92 to transmit the data from storage register section 61 via cables 77, 80 and 81 to ALU 64. The data is then added to itself in the ALU and the output 82 of the ALU is transmitted by gating circuits 103 and 104, under the control of clock phase B from source 93 and set pulse 0 from source 95, to storage register section 61. The ALU carry out 87 is not utilized.

Next, gating circuits 105 and 101, controlled, respectively, by set pulse 1 from source 96 and clock phase A from source 92, transmit data from storage register section 62 to the ALU. Again, the data is added to itself by the ALU. Gating circuits 103 and 106, controlled by clock phase B from source 93 and set pulse 1 from source 96, transmit the output 82 from the ALU to storage register section 62. In addition, the ALU carry out 87 appears on line 88 and, by means of set pulse 1 appearing at source 97 and by clock phase B from source 94, operating AND circuit 90, is transmitted on line 107 to the lowest order stage of storage register section 61.

Next, the data from storage register section 63 is gated, via gating circuits 108 and 101, controlled respectively by set pulse 2 from source 98 and clock phase A from source 92, to both sets of inputs of ALU 64. The ALU again adds the data to itself and supplies the sum on cable 82. Gating circuits 103 and 109, controlled by clock phase B from source 93 and set pulse 2 from source 92, then operate to transmit the sum on cables 83 and 84 to storage register section 63. In addition, the ALU carry out on line 87 appears on line 89. AND circuit 91 is then operated by set pulse 2 from source 99 and clock phase B from source 94 to gate the ALU carry out on line 110 to the lowest order stage of storage section 62.

Finally, set pulse 3 appears on line 100 as an input to AND circuits 111–116 as does clock phase B from source 94. Thus, at this time, the output from the highest order stage of storage register 61, appearing at one input 68 of modulo-two half-adder 69, is exclusive ORed with the output appearing on line 73 which is gated by AND circuit 111 to the other input of half-adder 69. Likewise, the outputs appearing on lines 74–76 are simultaneously gated by AND circuits 112–114 to be exclusive ORed by modulo-two half-adders 70–72 with the data appearing at the other inputs thereof. The resultant binary bit is gated by AND circuit 115 to modulo-two half-adder 66 and the following serial binary data bit appearing at input 65 is gated by AND circuit 116 to appear at the other input to half-adder 66. The resultant data is then inserted in the lowest stage of storage register section 63.

Hence, the circuitry of FIGURE 3 operates in functionally the same fashion as the apparatus of FIGURE 2, but utilizing ordinary storage registers 61–63 in combination with an ALU 64 rather than a special shift register 50.

While the invention has been particularly shown and described with reference to preferred embodiments thereof it will be understood by those skilled in the art that various changes in form and details may be made therein without departing from the spirit and scope of the invention.

What is claimed is:

1. Apparatus for shifting binary numbers comprising:
storage means for storing a plurality of binary digits comprising a binary number;
adding means for adding binary numbers; and
control means operative to transmit said binary digits stored in said storage means to said adding means and operate said adding means in response to said binary digits to add said binary number to itself, and to transmit the resultant sum from the output of said adding means to said storage means for storage therein, whereby said binary number is effectively shifted one bit position in said storage means.

2. The apparatus of claim 1 wherein:
said storage means is additionally arranged to receive binary data serially at an input terminal and to transmit data serially at an output terminal; and said control means is arranged to operate through one complete cycle within a time period less than that required for said serial receipt or transmission of two binary digits.

3. The apparatus of claim 1 wherein:
said adding means includes two sets of inputs, one set of outputs, and means for adding a binary number appearing at one set of inputs to a binary number appearing at the other set of inputs and supplying the result at said set of outputs; and
said control means comprises means for transmitting binary digits stored in said storage means to both of said two sets of inputs of said adding means, allowing said adding means to add said binary digits to themselves, and means for transmitting the resultant output of said adding means at said set of outputs to said storage means.

4. The apparatus of claim 3 wherein:
said storage means is additionally arranged to receive binary data serially at an input terminal and to transmit data serially at an output terminal; and
said control means is arranged to operate through one complete cycle within a time period less than that required for said serial receipt or transmission of two binary digits.

5. The apparatus of claim 3 wherein:
said control means comprises means for transmitting, in parallel, binary digits stored in said storage means to both of said two sets of inputs of said adding means, allowing said adding means to add said binary digits to themselves, and means for transmitting, in parallel, the resultant output of said adding means at said set of outputs to said storage means.

6. The apparatus of claim 1, wherein:
said adding means includes two sets of inputs numbering less than the capacity of said storage means, one set of outputs, said output set including a carry output, and means for adding a binary number appearing at one set of inputs to a binary number appearing at the other set of inputs and supplying the resultant product, including an output carry, at said set of outputs; and
said control means comprises means for transmitting binary digits stored in a portion of said storage means to both of said two sets of inputs of said adding means, allowing said adding means to add said transmitted binary digits to themselves, and means for transmitting said resultant product to said portion of said storage means and said output carry to the next higher order digit position adjacent said portion of said storage means.

7. A block parity generator comprising:
input means for supplying serial binary data;
storage means having a plurality of binary stages for storing a like plurality of binary digits comprising a binary number, a serial input, and a serial output, said serial output transmitting thereon the contents of a predetermined one of said stages;
feedback circuitry responsive to data supplied from selected stages of said storage means and said input means to combine said data in accordance with a predetermined equation to provide a resultant binary digit to said serial input of said storage means;
adding means for adding binary numbers; and
control means operative to transmit said binary digits stored in said storage means to said adding means and operate said adding means in response to said binary digits to add said binary number to itself, to transmit the resultant sum from the output of said adding means to said storage means for storage therein, whereby said binary number is effectively shifted one bit position in said storage means, and then to supply said data to said feedback circuitry to thereby operate said circuitry and supply said resultant binary digits to said serial input of said storage means.

8. The apparatus of claim 7 wherein:

said adding means includes two sets of inputs, one set of outputs, and means for adding a binary number appearing at one set of inputs to a binary number appearing at the other set of inputs and supplying the result at said set of outputs; and said control means comprises means for transmitting binary digits stored in said storage means to both of said two sets of inputs of said adding means, thereby allowing said adding means to add said binary digits to themselves, means for transmitting the resultant output of said adding means at said set of outputs to said storage means, and means for supplying said data to said feedback circuitry to thereby operate said circuitry and supply said resultant binary digit to said serial input of said storage means.

9. The apparatus of claim 8 wherein:

said feedback circuitry comprises modulo-two half-adders, inputs of which are operably connected to selected stages of said storage means, to said input means, and to outputs of other ones of said modulo-two half-adders in accordance with a predetermined equation to provide a single output line which is connected to said serial input of said storage means and operated by a gating signal, and said control means comprises clocking means and gating means operated selectively by said clocking means to, in sequence, transmit binary digits stored in said storage means to both of said two sets of inputs of said adding means to add said binary digits to themselves, transmit the resultant output of said adding means at said set of outputs to said storage means, and supply said gating signal to thereby operate said feedback circuitry and supply said resultant binary digit on said serial input of said storage means.

10. The apparatus of claim 7 wherein:

said adding means includes two sets of inputs, each set numbering less than the number of stages of said storage means, one set of outputs, said set including a carry output, and means for adding a binary number appearing at one set of inputs to a binary number appearing at the other set of inputs and supplying the resultant product, including an output carry, at said set of outputs, and said control means comprises means for transmitting binary digits stored in a sequential number of stages of said storage means to both of said two sets of inputs of said adding means, thereby allowing said adding means to add said transmitted binary digits to themselves, and means for transmitting said resultant product to said sequential number of stages of said storage means and said output carry to the next higher order stage adjacent said sequential number of stages of said storage means, and means for supplying said data to said feedback circuitry to thereby operate said circuitry and supply said resultant binary digit on said output line to said serial input of said storage means.

11. The apparatus of claim 10 wherein:

said storage means is divided into a plurality of sections, each section including a sequential number of said stages;

said feedback circuitry comprises modulo-two half adders, inputs of which are operably connected to selected stages of said storage means, to said input means, and to outputs of other ones of said modulo-two half-adders in accordance with a predetermined equation to provide a single output line which is connected to said serial input of said storage means and said circuitry is operated by a gating signal, and said control means comprises clocking means and gating means operated selectively by said clocking means to, in sequence, transmit binary digits stored in the highest order section of said storage means to both of said two sets of inputs of said adding means, thereby allowing said adding means to add said transmitted binary digits to themselves, to transmit said resultant product to said section of said storage means, to repeat said transmissions to and from the other sections of said storage means in order, each time additionally transmitting said output carry to the next higher order stage adjacent said section of said storage means, the data of which is being operated upon, and supply said gating signal to thereby operate said feedback circuitry and supply said resultant binary digit on said output line to said serial input of said storage means.

References Cited

UNITED STATES PATENTS

| | | | |
|---|---|---|---|
| 2,994,478 | 8/1961 | Sarahan et al. | 235—175 |
| 3,145,293 | 8/1964 | Homan | 235—175 X |
| 3,202,805 | 8/1965 | Amdahl et al. | 235—164 |
| 3,331,954 | 7/1967 | Kinzie et al. | 235—156 |

EUGENE G. BOTZ, Primary Examiner

C. E. ATKINSON, Assistant Examiner

U.S. Cl. X.R.

235—153, 156, 164